US010010095B2

(12) United States Patent
Vaccarella

(10) Patent No.: US 10,010,095 B2
(45) Date of Patent: Jul. 3, 2018

(54) PACKAGED FOOD PRODUCT, IN PARTICULAR CONFECTIONERY PRODUCT

(71) Applicant: MAGIC PRODUCTION GROUP (M.P.G.) S.A., Findel (LU)

(72) Inventor: Paolo Vaccarella, Baldissero Torinese (IT)

(73) Assignee: MAGIC PRODUCTION GROUP (M.P.G.) S.A., Findel (LU)

( * ) Notice: Subject to any disclaimer, the term of this patent is extended or adjusted under 35 U.S.C. 154(b) by 326 days.

(21) Appl. No.: 14/668,438

(22) Filed: Mar. 25, 2015

(65) Prior Publication Data

US 2015/0272158 A1    Oct. 1, 2015

(30) Foreign Application Priority Data

Mar. 25, 2014  (IT) .............................. TO2014A0247

(51) Int. Cl.
| | | |
|---|---|---|
| *A23G 1/54* | (2006.01) | |
| *B65D 43/16* | (2006.01) | |
| *B65D 85/60* | (2006.01) | |
| *B65D 77/04* | (2006.01) | |
| *B65D 75/32* | (2006.01) | |

(52) U.S. Cl.
CPC ........... *A23G 1/545* (2013.01); *B65D 43/162* (2013.01); *B65D 75/322* (2013.01); *B65D 77/0406* (2013.01); *B65D 85/60* (2013.01)

(58) Field of Classification Search
None
See application file for complete search history.

(56) References Cited

U.S. PATENT DOCUMENTS

| 5,728,414 A | * | 3/1998 | Terrasi | .................. | A23G 3/566 |
| | | | | | 426/104 |
| 2006/0062874 A1 | * | 3/2006 | Sinichko | ................ | A23G 1/505 |
| | | | | | 426/104 |
| 2011/0123687 A1 | * | 5/2011 | Gass | ..................... | A23G 3/563 |
| | | | | | 426/132 |

FOREIGN PATENT DOCUMENTS

| EP | 0951835 A2 | 10/1999 |
| EP | 1018302 A1 | 7/2000 |
| EP | 2252528 B1 | 9/2012 |

(Continued)

OTHER PUBLICATIONS

Search Report and Written Opinion issued in Italian Patent Application No. ITTO20140247 dated Jan. 12, 2015, (partially in English), 11 pages.

(Continued)

*Primary Examiner* — Viren A Thakur
*Assistant Examiner* — Thanh H Nguyen
(74) *Attorney, Agent, or Firm* — Rothwell, Figg, Ernst & Manbeck, P.C.

(57) ABSTRACT

Packaged food product and process utilizes a first and a second half-shell of edible material. Each of the first and second half-shells of edible material is coated with a respective covering adhering to its inner and outer surface, each covering including a first and a second half-shell of sheet material, shaped so as to adhere to the inner and respectively the outer surface of the respective half-shell of edible material, the half-shells of sheet material being connected together along their respective peripheral edges so as to form a closed covering which encloses the half-shell of edible material. The half-shells of to edible material, coated with the respective covering, are retained in close relationship.

10 Claims, 6 Drawing Sheets

(56) References Cited

FOREIGN PATENT DOCUMENTS

| GB | 1052153 A | 12/1966 | |
|---|---|---|---|
| WO | WO 02094030 A1 * | 11/2002 | ............... A23G 1/50 |
| WO | 2005/110880 A1 | 11/2005 | |
| WO | 2007/074355 A1 | 7/2007 | |
| WO | 2009/104207 A1 | 8/2009 | |
| WO | WO 2009104207 A1 * | 8/2009 | ............. B65D 75/32 |

OTHER PUBLICATIONS

Unknown: "Hotel Chocolat Extra Thick Easter Eggs; Big Enough for a Family of Six," XP002733935, retrieved from the Internet: URL: http://mymumdom.com/hotel-chocolat-easter-eggs/, Mar. 29, 2012, 5 pages.

Unknown: "Top 10 Best Luxury Chocolate Eggs in Easter 2013/ Godiva", XP002733936, retrieved from the Internet: URL:http:// web.archive.org/web/20130507221341/http:/www.amigabit.com/ blog/top-10-best-luxury-chocolate-eggs-in-easter-2013.html/ godiva, May 7, 2013, 3 pages.

* cited by examiner

PACKAGED FOOD PRODUCT, IN PARTICULAR CONFECTIONERY PRODUCT

CROSS REFERENCE TO RELATED APPLICATIONS

This application claims priority from Italian Patent Application No. TO2014A000247 filed on Mar. 25, 2014, which is incorporated herein by reference in its entirety for all purposes.

BACKGROUND OF THE INVENTION

The present invention relates to packaging of food products, particularly of a confectionery to product of the type comprising a first and a second hollow body or half-shell of edible material, whose respective edges of the annular mouth are arranged in a mutually facing relationship, so as to define a cavity in which an openable container of non-edible material is housed, which in its turn contains a product or an accessory item that constitutes a surprise for the consumer.

Such products have benefited from considerable commercial success and are marketed by Ferrero SpA with the trademark KINDER SORPRESA® [KINDER SURPRISE].

In the commercial product, the two half-shells of chocolate are generally welded together along the respective edges of the mouth facing one another and the food product is packaged in a covering of sheet material adhering to the outer surface of the product.

EP 2 252 528 B1 describes a solution in which, to facilitate opening of the packaging to gain access to the container of the surprise, the ovoid body of chocolate is packaged in two flanged half-shells of sheet material that are coupled to one another by folding and upsetting of the flange edges and in which the plane of separation of the half-shells of chocolate coincides with the plane of the flanges.

BRIEF SUMMARY OF THE INVENTION

The present invention tackles the problem of supplying a packaged product in which, on opening the packaging, i.e. following removal of the packaging covering, there is simultaneous separation of the half-shells of edible material of the container of the surprise and which, moreover, allows the consumer, following removal of the covering, to have immediate visual perception of the presence of the container.

A solution to this problem is described in EP 0 951 835 A and EP 1 018 302 A. In the packaging described in these documents, the container is provided with a rib, which the edges of the mouth of the edible half-shells come up against; this rib thus keeps the two edible half-shells separate and is visible from the outside following removal of the covering sheet. In this way, the consumer has an immediate perception of the presence of a non-edible body arranged between the edible half-shells.

However, a drawback of this solution is that both the inner surface, and the annular surface of the edges of the mouth of the half-shells of chocolate are completely in contact with the outer surface of the container, generally made of plastic, involving a risk of adhesion to said surfaces, for example following exposure to higher temperatures, with consequent deterioration of the product.

The present invention provides an alternative solution that overcomes the aforementioned drawback.

Thus, the invention relates to a packaged food product and a process for production thereof, having the features defined in the claims given hereunder, which constitute an integral part of the present description.

Further features and the advantages of the packaging according to the invention will become clear from the following detailed description, referring to the appended drawings, relating to the embodiment commonly adopted, but which is not imperative and does not limit the scope of the invention, in which the two half-shells of edible material are of semi-ovoid shape.

DETAILED DESCRIPTION OF THE INVENTION

Figure 1A:
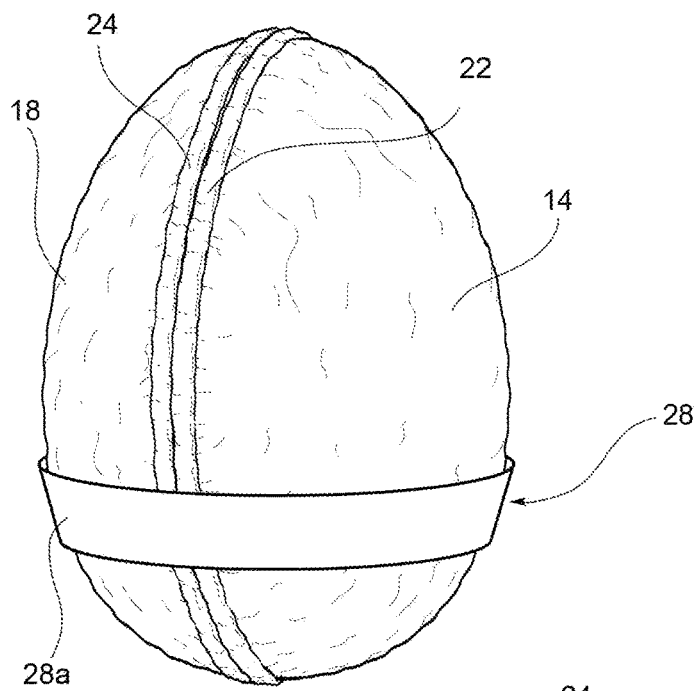
FIGS. 1a and 1b are perspective views of two embodiments of the packaging according to the invention.

Referring to the drawings, the food product is formed from a first and a second half-shell 2 and 4 of semi-ovoid conformation. In all the illustrations, each half-shell is formed from two superposed layers 2a, 2b and 4a, 4b, for example of white chocolate and of milk chocolate, conforming to the product currently on sale.

The two half-shells 2 and 4 are arranged with their respective annular mouth edges 6 and 8 in a mutually facing relationship, so as to define a cavity 10 in which a container 12 of non-edible material is housed, typically made of plastic.

Each half-shell of edible material 2 and 4 is coated with a respective covering of sheet material, each in its turn comprising a first and a second half-shell of sheet material 14, 16 and 18, 20 shaped so as to adhere to the outer and respectively inner surface of the respective half-shell of edible material. The material constituting the covering is typically a metal sheet or film, particularly aluminium, or a laminate of a metal film with a polymer film or a metal sheet or film coated with a heat-sealable lacquer.

Typically they are sheets or films having a thickness from 6 μm to 40 μm, preferably from 8 μm to 20 μm, for example 12 μm.

Figure 6:
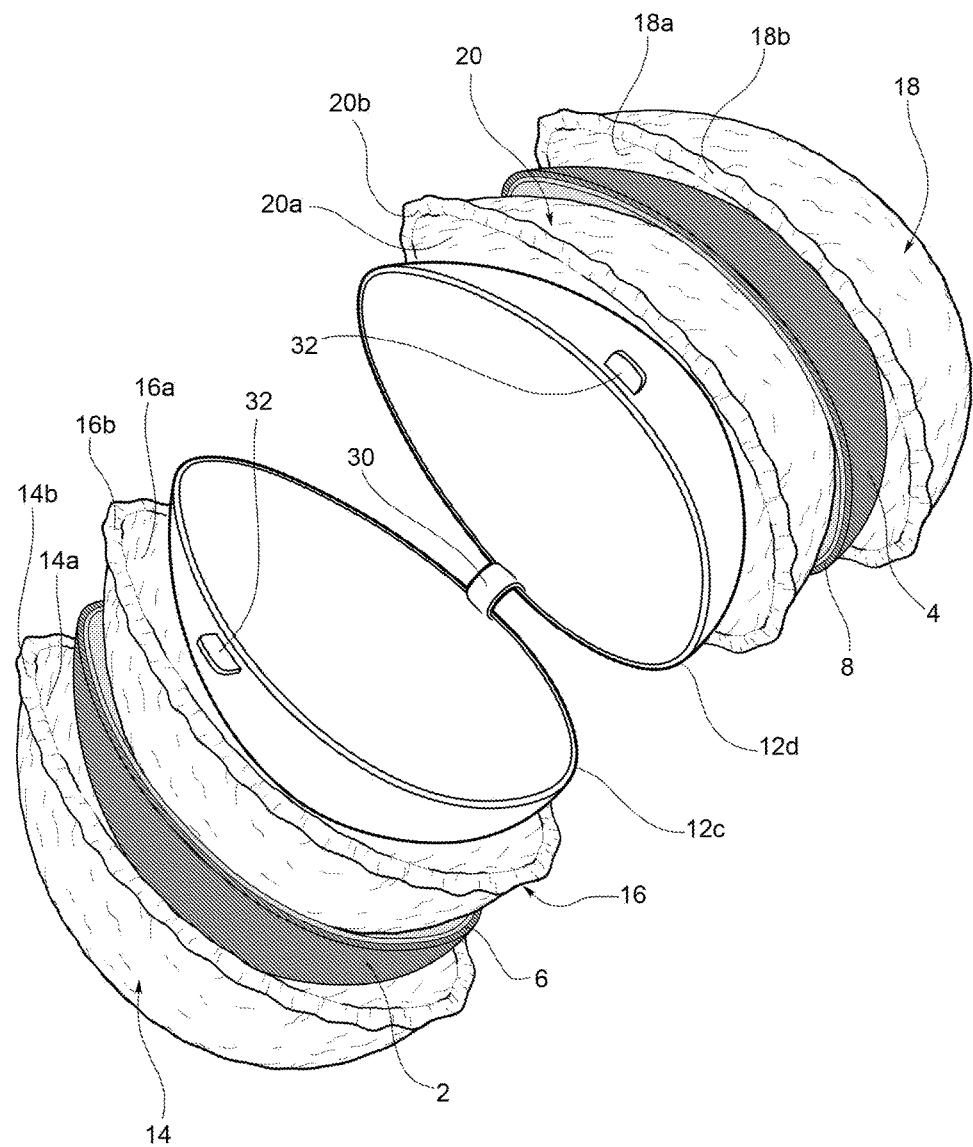
FIG. 6 is an exploded perspective view of the packaging in FIG. 5.

Each half-shell of sheet material has a hollow portion 14a and 16a (and respectively 18a, 20a (FIG. 6)) that is of a shape substantially complementary to the outer and respectively inner surface of the respective shell of edible material. Moreover, each half-shell has a peripheral portion as a flange 14b and 16b (and respectively 18b and 20b), with an annular extension, in the present case ovoid, surrounding the respective hollow portion.

To obtain a closed covering that coats the half-shell of edible material, the peripheral portions 14b and 16b and, respectively, 18b and 20b are coupled together. The connection may be of the permanent type, by gluing or welding, so as to produce a hermetic covering, or of the type that is releasable by juxtaposition of said peripheral portions, folding and/or upsetting.

A combination of the aforementioned operations may also be used, i.e. preliminary gluing or welding, followed by a folding operation, in which said peripheral portions are folded back on themselves and optionally upset against the outer surface of the covering.

In this last-mentioned embodiment it is preferable that the area of welding or of gluing, which makes it possible to obtain hermetic closure of the covering, is performed in an end region of the juxtaposed peripheral portions or else in a region at a distance from the hollow portion of the covering and that folding of said peripheral portion, in a direction orthogonal to the plane of the juxtaposed peripheral portions, is performed along a folding line that does not pass through the area of welding or gluing, so that this welded area is in a region distal from the two folded peripheral portions, so that the heat emitted by the welding device cannot damage the chocolate.

As a result of the operation of folding and/or upsetting, two annular formations are obtained, projecting outwards, in the form of a flattened rib, indicated with 22 and 24 in the appended drawings.

In the packaging according to the invention, the annular edges of the half-shells of edible material 2 and 4, coated with the respective covering of sheet material, are maintained in close relationship, preferably equidistant, by retaining means 28 external to said coverings. The term "close" and the term "equidistant" include the case in which the distance is zero or almost zero, so that said edges, coated with the respective covering, are in a juxtaposed relationship, as illustrated in the embodiments in FIGS. 1a and 1b.

Figure 4A:
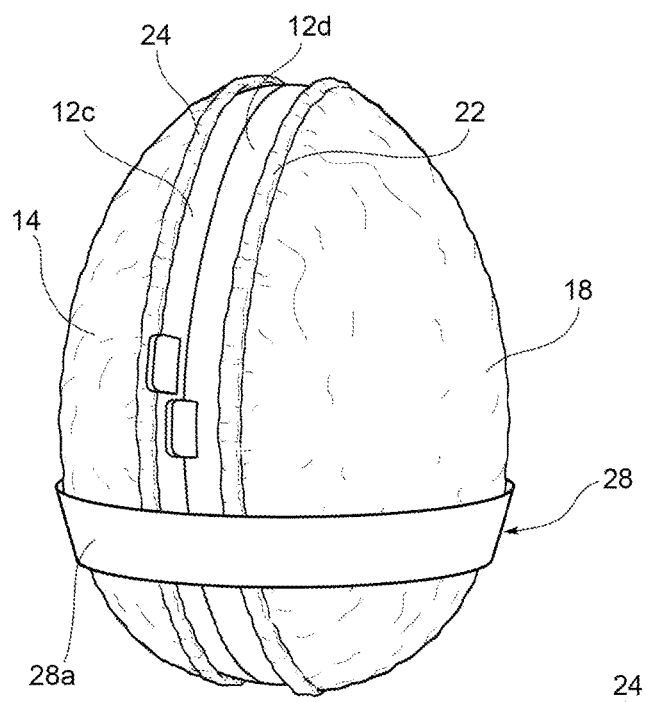
FIGS. 4a and 4b are perspective views of two alternative embodiments to those illustrated in FIG. 1a and 1b.
Figure 4B:
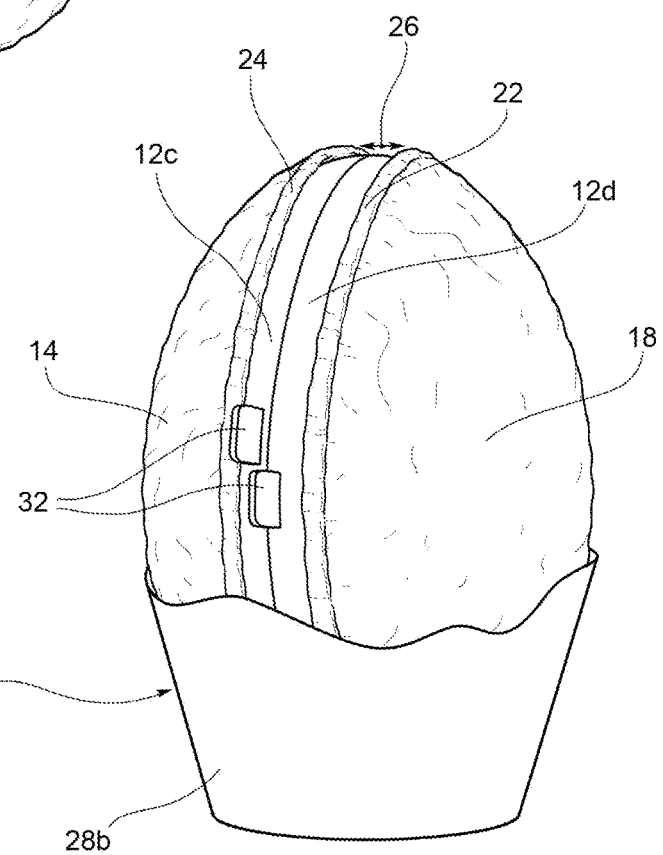
Figure 5:
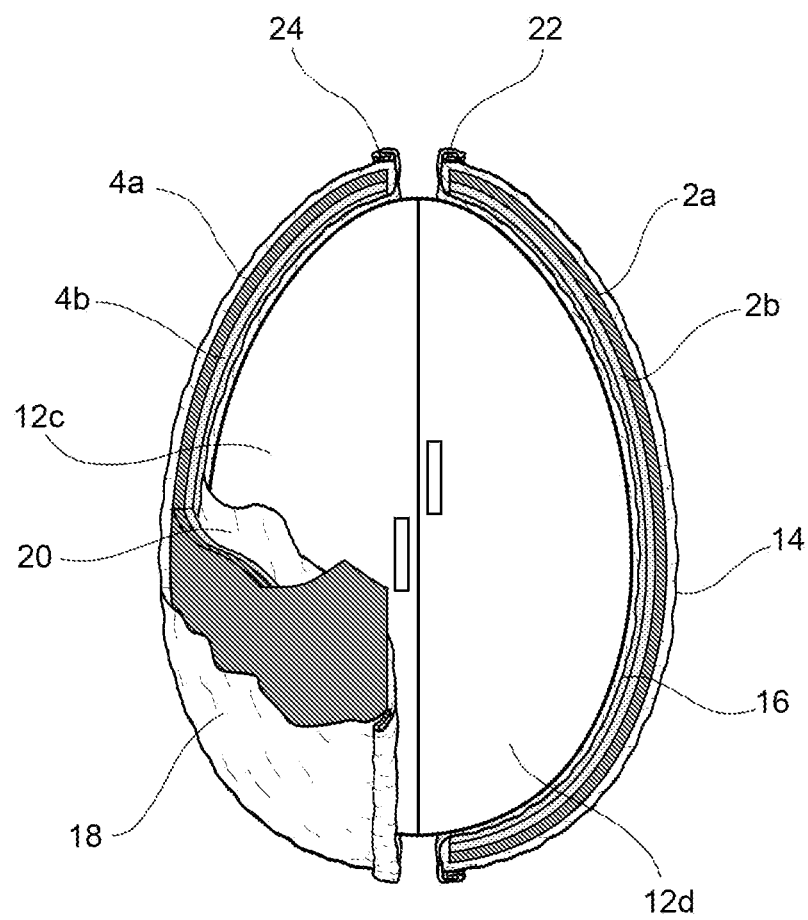
FIG. 5 is a partially sectional view of the packaging in FIG. 4a or 4b, from which the retaining means have been removed.

Naturally, these terms also include the case in which said coated edges are at a distance from a gap, as indicated with 26, in the corresponding embodiments in FIGS. 4a and 4b.

Figure 1B:
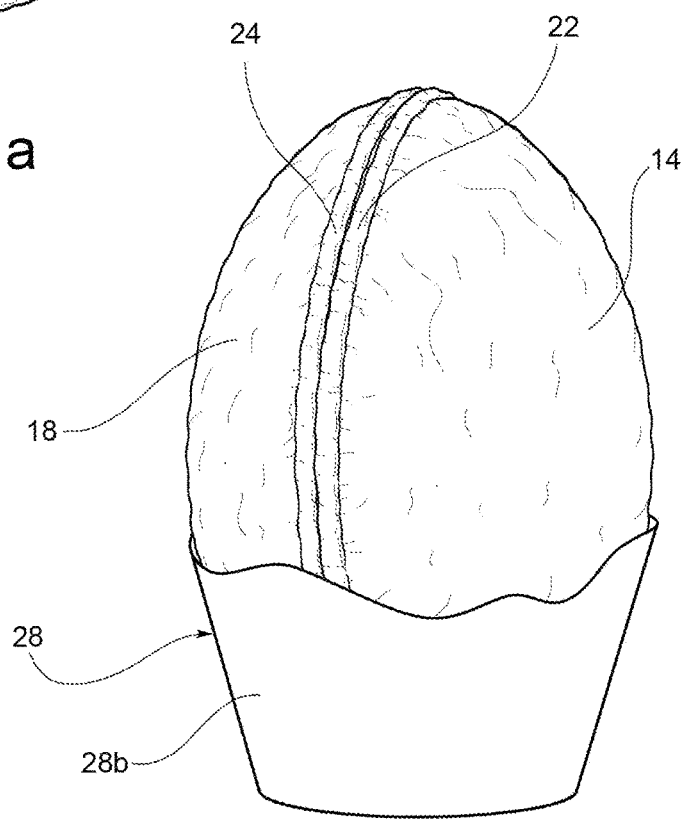
Figure 2:
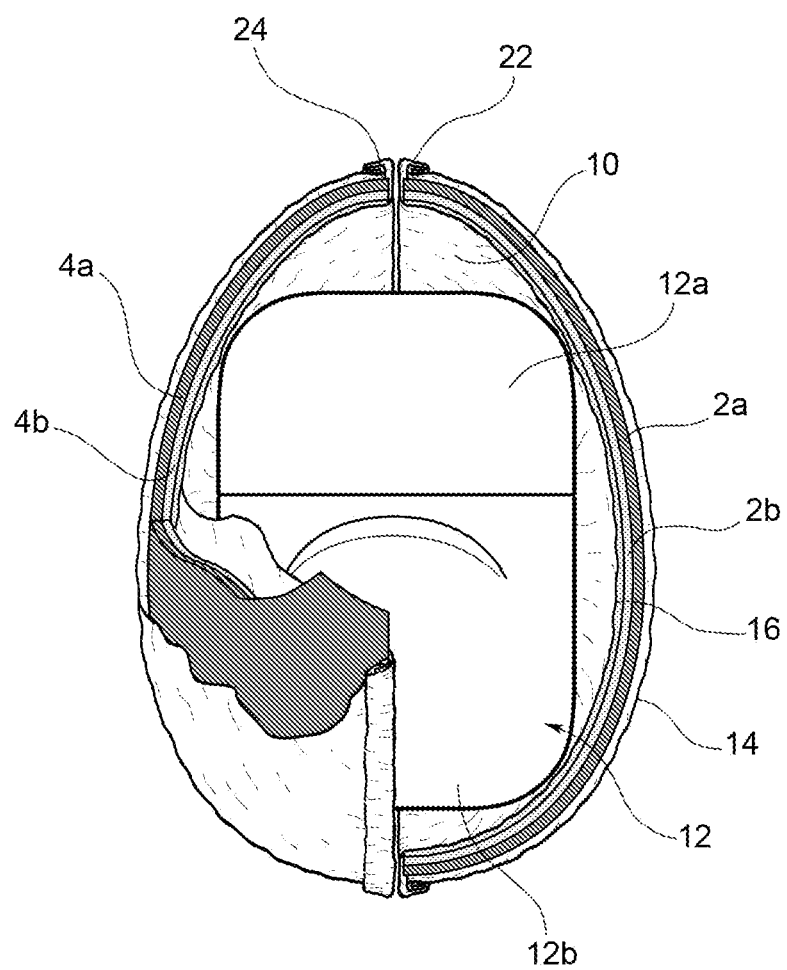
FIG. 2 is a partially sectional view of packaging according to FIG. 1 or 2, not including the retaining means.
Figure 3:
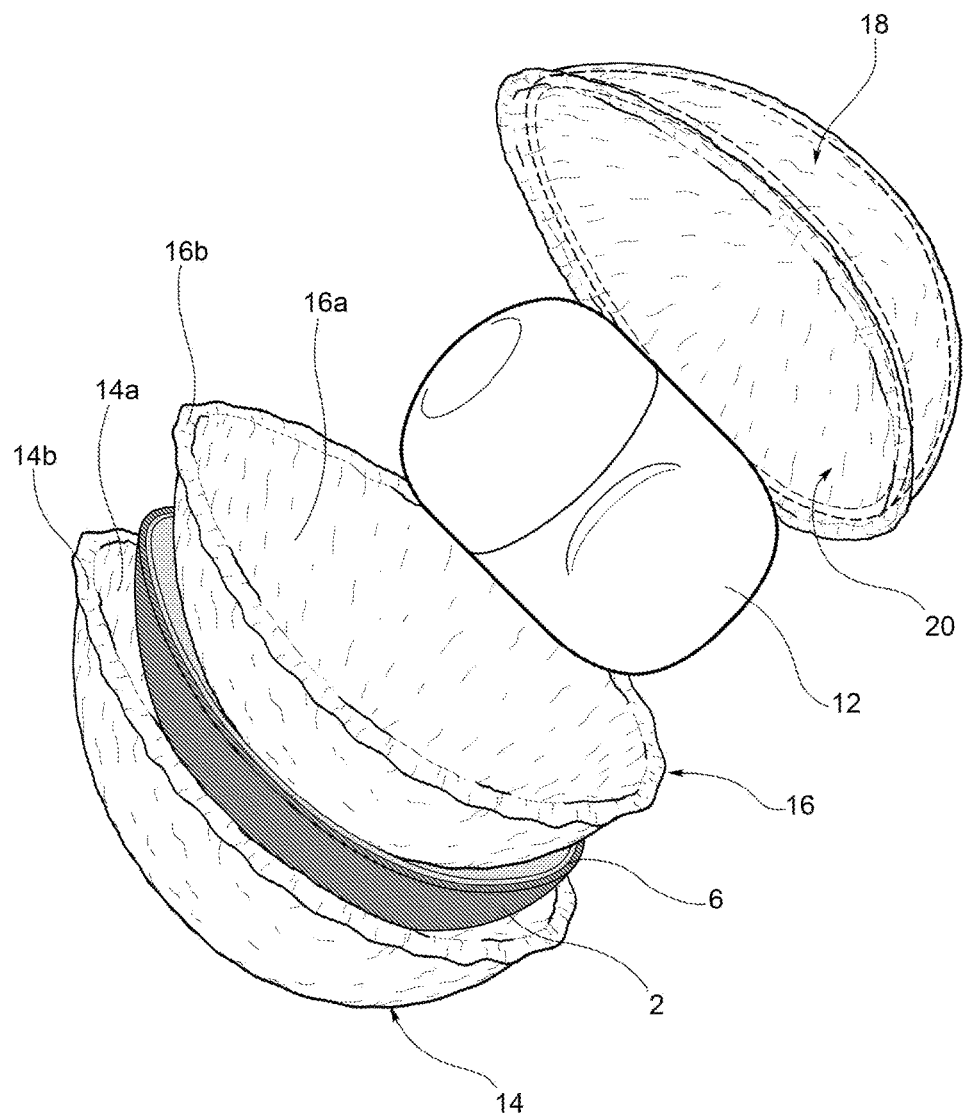
FIG. 3 is a partially exploded perspective view of the packaging in FIG. 2.

In the embodiments in FIGS. 1a and 1b, as illustrated in the sectional view in FIG. 2, the two coated half-shells enclose within them the container 12, typically made of plastic, which is thus hidden from the eyes of the consumer. However, since the half-shells of edible material, coated with the respective covering, are linked together solely by the retaining means 28, their removal by the consumer makes the container 12 available immediately. to The presence of the inner half-shells of sheet material 16 and 20, whose peripheral region also covers the annular mouth edges of the half-shells of edible material 2 and 4, avoids accidental phenomena of adhesion between them, which might occur as a result of exposure to elevated temperatures.

In these embodiments, container 12 may assume any shape, provided it is dimensioned to allow juxtaposition of the coated half-shells of edible material. This container typically comprises two half-shells 12a and 12b coupled mouth to mouth by simple contact or by engaging means with front engagement, which preferably are connected to one another by articulating means integral with the container, for example a film hinge or snap hinge. The container may for example be made in conformity with the container for surprises described in WO 2005/110880 or WO 2007/074355.

In the embodiment in FIGS. 4a, 4b and 5 and 6, in which two coated half-shells of edible material are in a spaced relationship, the container 12 is formed from two half-shells made of plastic 12c and 12d, of semi-ovoid conformation, the outer surface of which is substantially complementary to the inner surface of the two half-shells of sheet material 16 and 20. The container 12 is in this case dimensioned so as to keep the two coated half-shells of edible material apart, so that an annular portion of the container is immediately visible from the outside, in the region of gap 26.

The two half-shells 12c and 12d may be hinged together by a flexible tongue 30 and may also have, adjacent to their mouth profile, a tongue 32, projecting outwards, which facilitates opening of the container.

The retaining means 28, whose function is to ensure the integrity of the packaging, maintaining the coated half-shells in a close and preferably equidistant position, may for example consist of a clamp 28a, elastic or of heat-shrink plastic material, which surrounds the outer half-shells of sheet material; the inner surface in contact with the product may be adhesive.

Alternatively, the retaining means may consist of a bowl 28b or similar, having a wall that to surrounds the two coated half-shells in an annular fashion and a bottom wall, preferably flat, that functions as a supporting base; the inner surface in contact with the product is preferably adhesive.

For industrial production of the packaged product according to the invention, it is preferable to adopt a process that initially envisages production of the two half-shells of edible material, coating of them with the respective two half-shells of sheet material, and connection of their peripheral regions, as described above.

The container 12 for surprises is then inserted in one of the two coated half-shells and the other coated half-shell is housed in a covering, using retaining means for maintaining the integrity of the packaging.

Naturally, without prejudice to the principle of the invention, the embodiments and the details of implementation can be varied from what is described as an example, while remaining within the scope of the claims given hereunder.

What is claimed is:

1. A packaged food product, comprising:
   a first and a second half-shell of edible material, each having a respective annular edge, said first and second half-shells being arranged with their respective annular edges in a mutually facing relationship,
   an openable container of non-edible material interposed between said half-shells, having a wall that defines within it a volume for housing a product or accessory item,
   wherein each of said first and second half-shells of edible material is coated with a respective covering adherent to its inner and outer surface, each covering comprising a first and a second half-shell of sheet material, shaped so as to adhere to the inner and respectively outer surface of the respective half-shell of edible material,
   wherein each of said first half-shell of sheet materials are connected to the respective second half-shells of sheet material along their respective peripheral edges so as to form a closed covering which encloses the respective first and second half-shell of edible material,
   retaining means being provided to keep the half-shells of edible material coated with the respective covering in close relationship.

2. A packaged food product according to claim 1, wherein said half-shells of sheet material comprise a hollow portion shaped in a substantially complementary way to the inner surface and, respectively, outer surface of the respective half-shell of edible material and a peripheral portion, said peripheral portions being connected together by gluing, welding, folding and/or upsetting or by a combination of gluing or welding with folding and/or upsetting.

3. A packaged food product according to claim 1, wherein said annular edges of the half shells of edible material covered by the respective covering are in juxtaposed relationship, so that said container interposed between the two half-shells is not made visible from the outside.

4. A packaged food product according to claim 1, wherein said annular edges of the half-shells of edible material, coated with the respective covering, are spaced apart, so that an empty gap is defined between said coated edges, which makes visible a portion of the container wall interposed between the two half-shells.

5. A packaged food product according to claim 4, wherein said container is formed by two half-shells of non-edible material, the outer surface of which is substantially complementary to the inner surface of said half-shell of sheet material that covers the inner surface of the respective half-shell of edible material.

6. A packaged food product according to claim 5, wherein said first and second half-shell of non-edible material of the container is dimensioned in such a way as to keep the two coated half-shells of edible material in a spaced relationship.

7. A packaged food product according to claim 1, wherein said retaining means are constituted by a clamp of elastic material or of heat-shrink material, optionally adhesive on all or part of its surface in contact with said coated half-shells.

8. A packaged food product according to claim 1, wherein said retaining means comprise a bowl with a side wall which surrounds an annular portion of said coated half-shells, arranged in a close relationship.

9. Process for the production of a packaged food product according to claim 1, comprising the steps of:
coating a first and a second half-shell of edible material with a respective covering of sheet material comprising a first and a second half-shell of sheet material, shaped so as to adhere to the inner and respectively outer of the respective half-shells of edible material;
connecting by coupling the peripheral edges of said half-shells of sheet material, so as to form a closed covering that encloses the respective half-shell of edible material;
inserting, in one of said half-shells of edible material covered by the respective covering, a container of non-edible material;
coupling the two coated half-shells of edible material with the respective annular edges in a facing close relationship, and
tying said coated half-shells of edible material by external retaining means, so as to keep said coated half-shells of edible material in close relationship, preferably equidistant.

10. A packaged food product according to claim 8, wherein said side wall comprises an adhesive.

* * * * *